Figure 1:
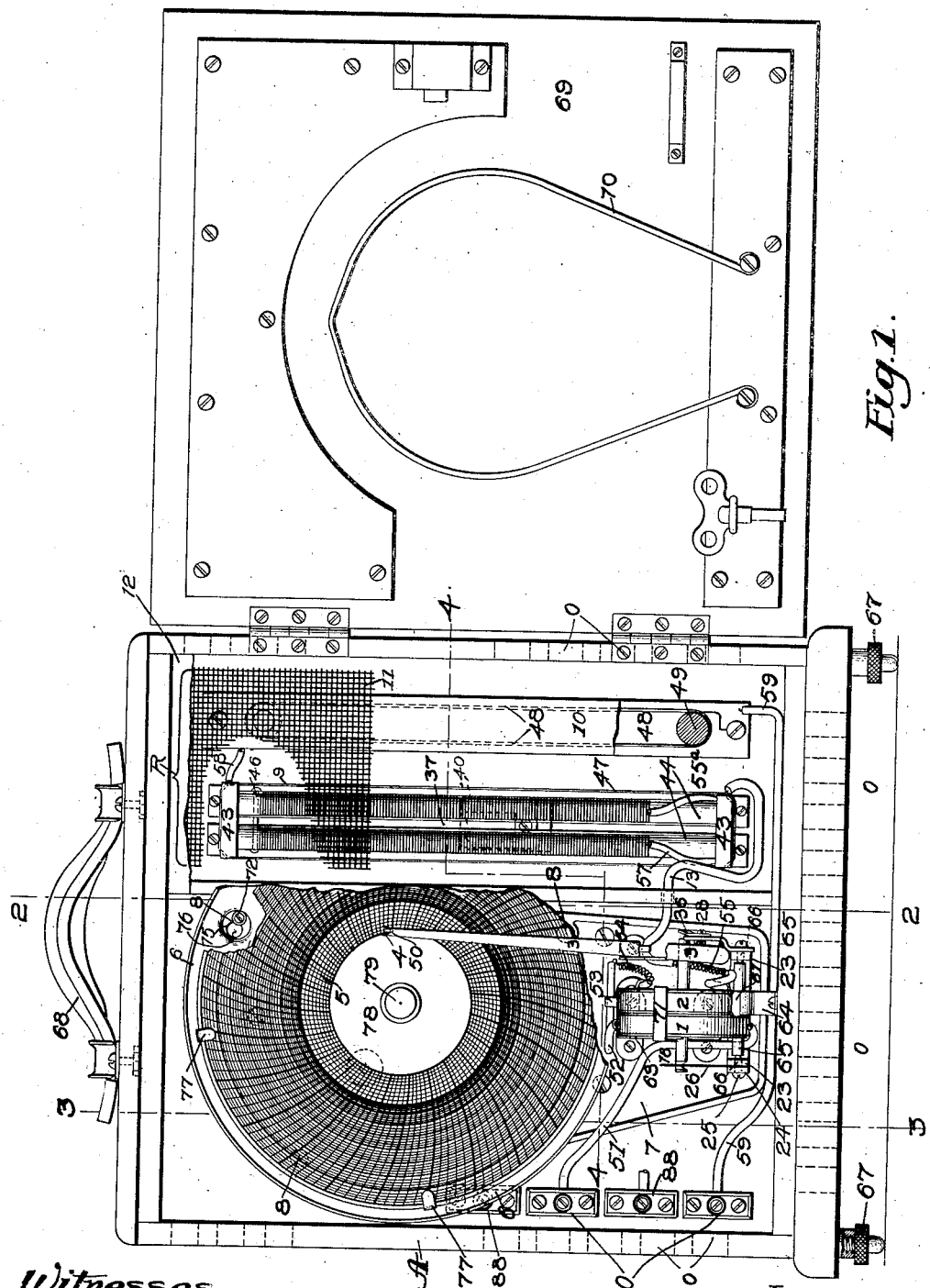

W. E. GOODYEAR.
PORTABLE RECORDING VOLTMETER.
APPLICATION FILED JUNE 30, 1906.

1,115,925.

Patented Nov. 3, 1914.
4 SHEETS—SHEET 1.

Witnesses
Adolph C. Kaiser.
Robert H. Kammke.

Inventor:
Watson E. Goodyear.
by Emery & Booth,
Attys

W. E. GOODYEAR.
PORTABLE RECORDING VOLTMETER.
APPLICATION FILED JUNE 30, 1906.

1,115,925.

Patented Nov. 3, 1914.
4 SHEETS—SHEET 2.

Witnesses
Adolph C Kaiser
Robert H. Kammler

Inventor:
Watson E Goodyear,
by Emery & Booth
Attys.

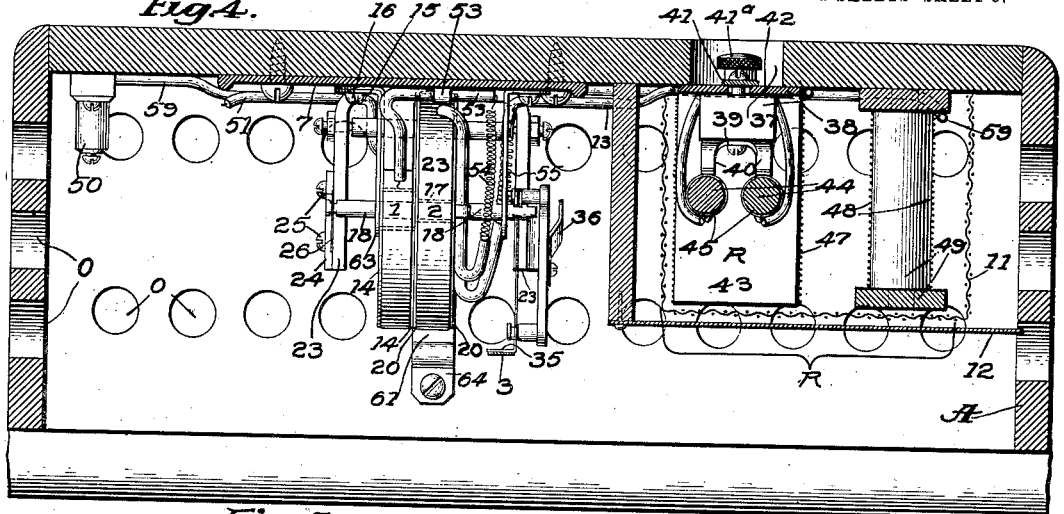
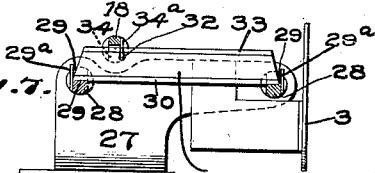
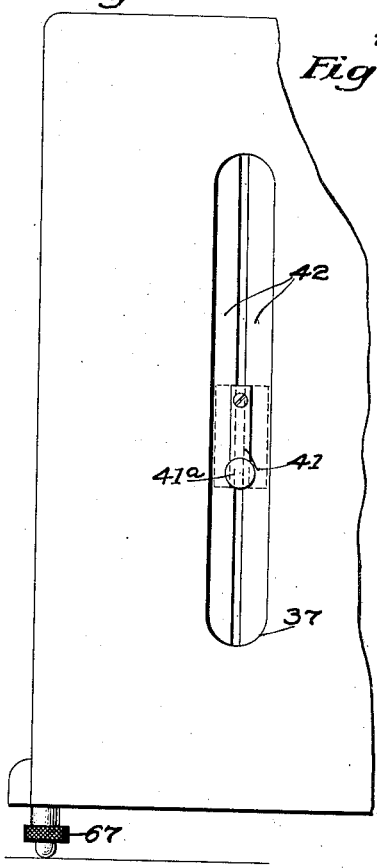
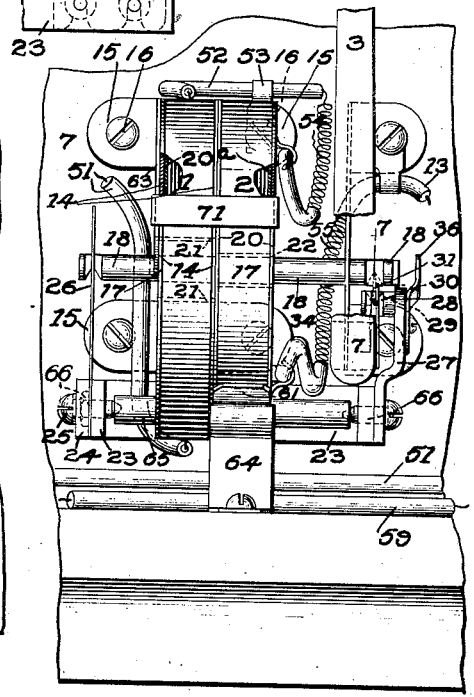
W. E. GOODYEAR.
PORTABLE RECORDING VOLTMETER.
APPLICATION FILED JUNE 30, 1906.
1,115,925. Patented Nov. 3, 1914.
4 SHEETS—SHEET 3.
Witnesses:
Adolph C. Kaiser
Robert H. Kammler
Inventor:
Watson E. Goodyear.
by Emery & Booth,
Attys

UNITED STATES PATENT OFFICE.

WATSON E. GOODYEAR, OF NAUGATUCK, CONNECTICUT, ASSIGNOR, BY MESNE ASSIGNMENTS, TO THE FOXBORO COMPANY, OF FOXBORO, MASSACHUSETTS, A CORPORATION OF MASSACHUSETTS.

PORTABLE RECORDING-VOLTMETER.

1,115,925.   Specification of Letters Patent.   Patented Nov. 3, 1914.

Application filed June 30, 1906. Serial No. 324,207.

*To all whom it may concern:*

Be it known that I, WATSON E. GOODYEAR, a citizen of the United States, residing at Naugatuck, in the county of New Haven and State of Connecticut, have invented an Improvement in Portable Recording - Voltmeters, of which the following description, in connection with the accompanying drawings, is a specification, like letters on the drawings representing like parts.

My invention relates to electric meters, more particularly to a portable instrument for measuring and recording electrical units, such as volts, amperes, watts, etc.

An aim of my invention is to improve the types of recording voltmeters that are provided with movable coils or solenoids, by the special arrangement, mountings and windings of the solenoids through which an electrical current passes to move the indicating or recording device, in accordance with the variations in current and to provide an instrument that is equally adapted for use with either alternate or direct currents. In voltmeters of this type as hitherto constructed, the solenoids or coils are normally separated and are arranged for relative movement one toward the other. When these solenoids are energized by an electric current mutual attraction between said solenoids results, causing not only a movement of one toward the other, but an accumulation of the effects due to the self and mutual induction of the solenoids. The relative movements of the solenoids being affected by this accumulation, the efficiency of the instrument is impaired, rendering it less sensitive and accurate than is required of an instrument of this character.

My invention furthermore aims to overcome this defect by eliminating such cumulative effects of induction, the number of lines of force mutually included by the solenoids remaining approximately constant during their relative movements. This result may be secured, as in the particular embodiment of my invention hereinafter described, by winding the solenoids in opposite directions and by mounting them in juxtaposition to permit of their separation by the magnetic repulsion produced between them through the effects of said current.

Still another aim of my invention is to provide a much needed portable instrument that can be carried about for testing purposes and set up and leveled in any convenient place, and in which the casing of the instrument is provided with means for holding the various instrumentalities in a compact arrangement and to prevent mobility of the parts in carrying or moving the instrument about.

These and other aims and features and advantages of my invention, however, will be best understood and appreciated from the following description, when considered in connection with the accompanying drawings of an instrument embodying one form of my invention and selected for purposes of illustration, its scope being more particularly pointed out in the appended claims.

Figure 2:
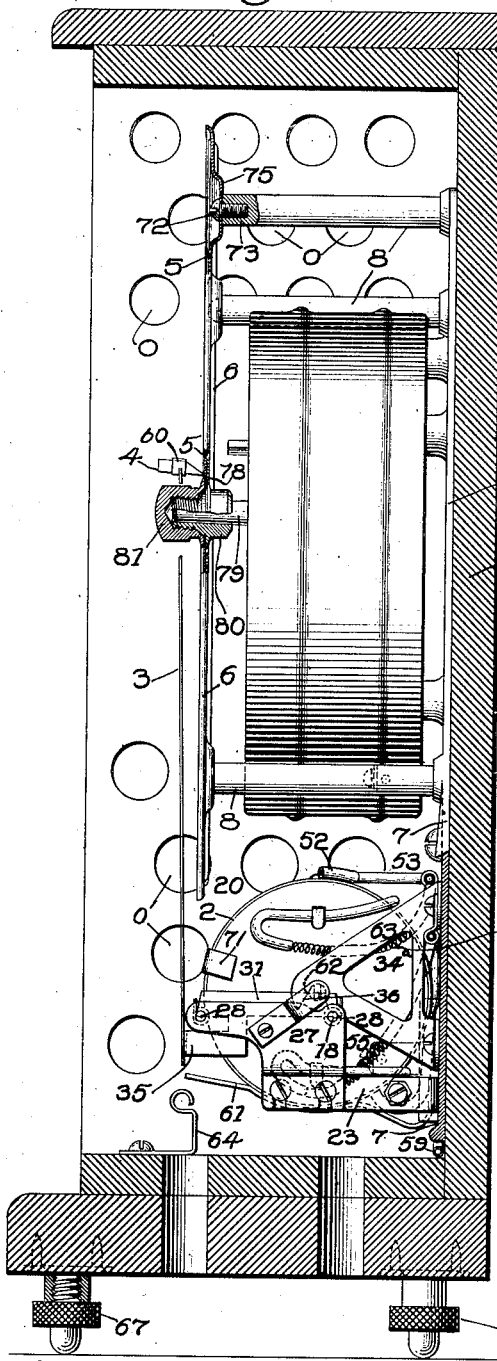
Figure 3:
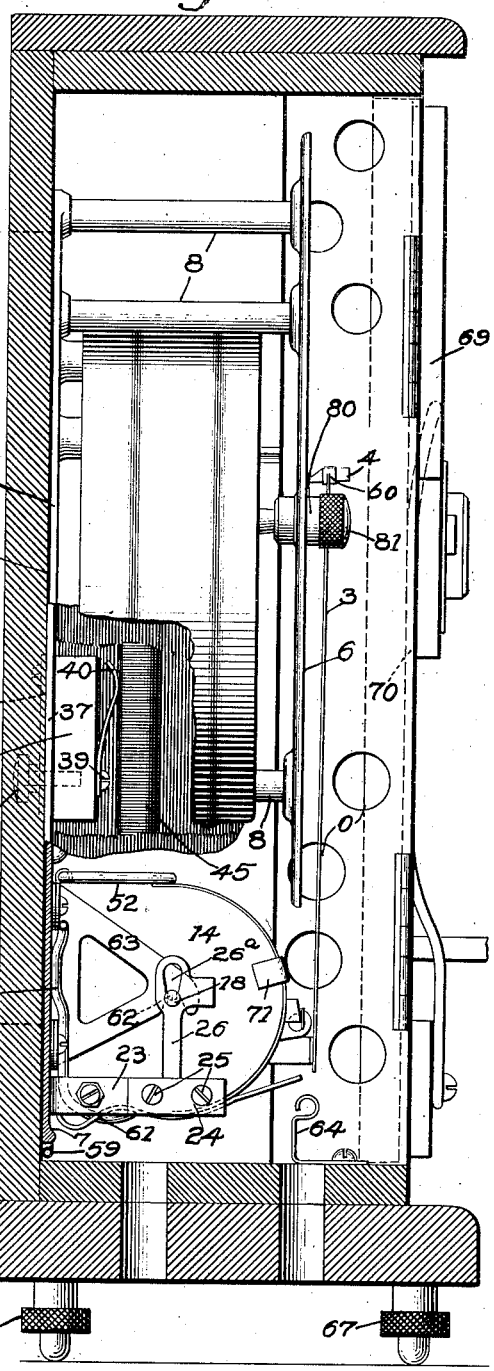
Figure 8:
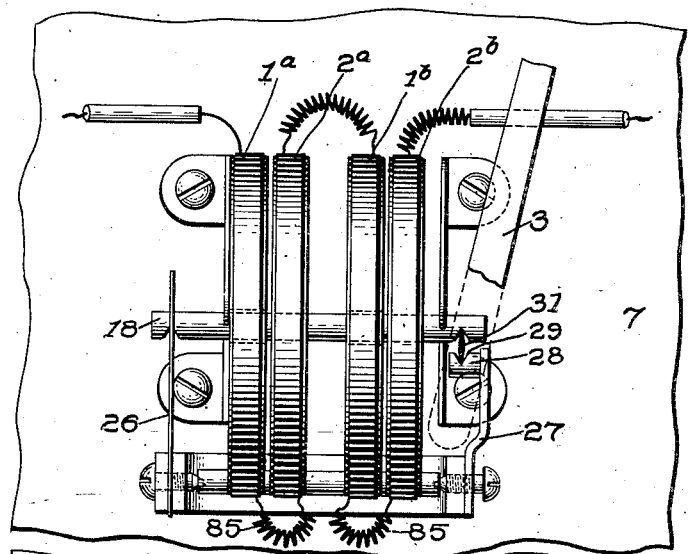

Referring to the drawings,—Figure 1 is a front elevation of a complete instrument selected for purposes of illustration; Fig. 2, a vertical section on line 2—2, Fig. 1, looking from the right, parts being broken away for clearness of illustration; Fig. 3, a similar section from the left on line 3—3, Fig. 1; Fig. 4, a horizontal section on line 4—4, Fig. 1; Fig. 5, a detail of the back of the case; Fig. 6, an enlarged detail of the solenoids, pen arm and their supports; Fig. 7, a sectional detail on line 7—7, Fig. 6; and Figs. 8 and 9, modifications of voltmeter construction showing in elevation a plurality of stationary and movable solenoids and the connections therefor.

In the embodiment of my invention herein illustrated (see Fig. 1) a portable recording voltmeter is shown, comprising a stationary solenoid, 1, and a movable solenoid, 2, with which is movably connected a deflectable arm, 3, having at its upper end a recording or marking device, such as a pen 4. This pen swings in inking relation to a chart 5 (Figs. 1 and 2), in the present instance revolubly mounted upon a stationary dial 6, and rotated by the usual clockwork (not shown) secured behind it upon a supporting frame 7. This frame is secured to the back of a case A, in which the several parts of the instrument are compactly arranged, said frame being provided with posts, 8, on which said dial 6, is removably secured. At the right of said case and partitioned off from the solenoids and recording device, is a rheostat, R, (Fig. 1) with its resistance coils 9, 10 separated from the voltmeter by a wire screen, 11, and covered by a face plate 12 (Figs. 1, 2 and 3), thereby providing adequate protection both to the voltmeter and rheostat.

The solenoids or coils constituting the operative parts of the voltmeter, are wound in opposite directions, and provided with suitable connections with one another, and with the rheostat R, and binding posts 50, the latter being mounted at the base of the frame 7. The opposite windings of the solenoids are preferably exactly equal in ampere turns. This preferred construction of equal and opposite winding serves to prevent cumulative inductional effects in the solenoids, and renders the instrument capable of true and accurate measurement of electrical units without error due to incidental inductional effects. This important result arises from the fact that self-induction in each solenoid tends to decrease the current passing therethrough, while the external inductive effect of one coil upon the other oppositely wound coil tends to increase the current flowing through the latter and thereby to negative self-inductional effects upon the latter. If the coils were wound in the same direction, mutual induction and self-induction would act cumulatively to impair the accuracy of the measurement; and if the coils were materially different in length though oppositely wound, the compensating coaction of self and mutual induction would be inadequate. In the present instance (Fig. 4) the stationary solenoid 1, is rigidly held between a pair of vertically supported plates, 14, preferably of brass and approximately annular in shape. These plates are secured to said frame 7, by means of ears 15, and screws, 16 (Figs. 4 and 6) and are suitably shaped to the coil at its outer edges. Each plate is furthermore provided with a central opening, 17, to receive the horizontal spindle, 18, to which the movable solenoid, 2, is secured. This solenoid, 2, is provided with annular brass facing plates, 20, for holding the solenoids in place and for retaining suitable inner iron disks or armatures 20ª, though, obviously, non-magnetic material may be substituted therefor, or in the construction of plates, 14 and 20, my invention not being limited in this respect.

The stationary and movable solenoids are each provided in the present instance, with a tubular core, said cores being respectively indicated by reference numerals 21, 22, in the drawings (see Fig. 6) that of the movable solenoid, 2, constituting a sleeve on said spindle, 18, for adjustably securing it thereon, and the interior diameter or bore of the tubular core, 21, of said stationary solenoid, 1, being large enough to permit said spindle, 18, to reciprocate freely therein.

In order that the movable solenoid, 2, may be mounted to reciprocate horizontally with its spindle or shaft, 18, sliding axially relative to the solenoid, 1, said spindle is supported by a horizontal yoke frame, 23 (Figs. 4 and 6), secured to said frame, 7. At its front end, the left arm of said yoke (Fig. 3) is provided with a clamping plate, 24, and screws, 25, by which a vertical spring arm, 26, is secured thereto. This arm has an ovoid-shaped slot, 26ª, at its upper end constituting a guide and knife edge support for a bearing formed upon the adjacent end of said spindle, 18, the opposite arm of the yoke (Fig. 2) having a vertical supporting frame, 27, similarly secured thereto. At its ends, this frame has a pair of horizontal screw studs, 28, each provided with a V-shaped notch or knife edge bearing, 29, (Figs. 6 and 7) to receive a knife edge, 30, formed upon a thin vertical knife edged plate, 31, on which said pen arm, 3, is secured. The opposite ends of this plate are inclined (see Fig. 7), the lower corners respectively engaging vertical steel bearing plates, 29ª, inserted and longitudinally arranged in said studs, 28, at the outer ends of said V-shaped or knife edge bearings, 29. By this arrangement the pointed ends of said plate, 31, engage said steel plates, 29ª, at but one point, thus diminishing friction at the ends of said plate and permitting the recording arm to swing freely to more accurately measure the variations in volts.

As herein shown (Figs. 2 and 7) said plate, 31, has a small horse-shoe shaped notch, 32, in its upper edge and is also provided with a knife edge, 33, the opposed points of said notch, 32, (Fig. 7) engaging a vertical steel bearing plate 34ª, secured adjacent one end of a V- or knife edge bearing, 34, formed in the adjacent end of the spindle, 18, (Fig. 6) acting as a support therefor, and causing the pivoted knife edge plate, 31, to rock as the movable solenoid is separated from the stationary solenoid by the mutual repulsion produced between them when energized, the spring supporting arm, 26, (Figs. 3 and 6) yielding to permit said solenoid and its spindle, 18, to reciprocate. By causing said spindle, 18, to engage the rock plate, 31, only by its knife edge bearing, 34, and thin steel plate, 34ª, and as said plate, 31, only bears upon the latter at two points, friction in a direction parallel or opposite to the rocking motion thereof is practically eliminated. By pivoting the knife edge plate below the plane of the reciprocations of said spindle and by causing the latter to engage it above its rocking edge, the motions of the free end of the recording arm are much greater than those of the movable solenoid and its spindle, said plate, 31, acting as a multiplying device therefor. That the pen arm, 3, may be suitably secured to said pivoted knife edge plate, 31, to be deflected thereby upon movement of the movable solenoid, 2, said plate at its front end, has an angular strip, 35, (Fig. 4) shaped to present an outer vertical transverse face upon which the lower end of said pen arm, 3, is secured by any suitable means, as solder. To prevent said arm, 3, from deflecting beyond the range of the scale of the chart, the supporting frame, 27, is provided with a stop arm, 36, (Figs. 4 and 6) against which the right end of the spindle abuts in its outward motion, thereby arresting its motion in that direction and consequently that of the pen arm.

To secure suitable ventilation the bottom and sides of the casing A are provided with a series of circular openings, o, through which the air may circulate freely.

In order that the resistance of the rheostat may be varied or adjusted, the following arrangement is made: The back of said case (see Figs. 1, 4 and 5) has a vertical slot, 37, in which is adjustably secured a slide plate, 38, (Fig. 3), which is provided, in the present instance, with a yoke contact plate, 39, having inwardly curved spring contact fingers, 40. This plate, the yoke 39, and the contact fingers carried thereby are adjustably held in desired position (Fig. 5) by an outer clamping plate, 41, and screw, 41ª, the slot, 37, receiving a pair of vertical plates, 42, suitably spaced apart and secured to said casing A, and between which said screw slides and carrying said plates 38 and 41 with it. These slot plates, 42, constitute a frame on which the rheostat R, is mounted (see Figs. 1 and 4), horizontal brackets, 43, being secured to the top and bottom of said plates for supporting intermediate spindles or rods, 44, each constituting a core for a rheostat coil, 45. These coils are connected in series at their upper ends by a cross pin, 46, and the left coil, 45, is connected in series with an outer inclosing resistance coil, 47, wound around the brackets, 43. The insulation at the back of the rheostat coils, 45, is removed so that the ends of the said fingers, 40, may slide in metallic contact therewith. Said coil, 47, is connected in series with a second resistance coil, 48, wound on a vertical reel, 49, secured to the back of the instrument case A and at the right side of said coil, 47.

Within the voltmeter compartment and secured at the left side of the back of the said case, are binding posts, 50, each opposite to one of the perforations o, to facilitate connection with an external circuit.

Referring to Figs. 1, 4 and 6, the circuit may be traced as follows: Assuming that the current enters by the upper post, 50, said current flows by the connecting wire, 51, to the stationary solenoid, 1, around its coil, leaving by wire, 52, (Fig. 6) supported by a guide 53, and thence respectively to and from the movable solenoid, 2, by means of the light spring conducting coils, 54, 55, the latter connecting with the rheostat coil, 45, (Figs. 1 and 4) on the right coil or spindle, 44, by a wire, 13, thence through the pin, 46, left coil, 45, wire, 57, coil, 47, wire, 58, to auxiliary coil, 48, and by wire, 59 to lower post 50. The current, however may be brought in to the lower post, 50, to flow through the instrument in the opposite direction. The wire at the back of the coil, 45, having the insulation removed, the slide of the plate, 38, in the slot, 37, causes the spring contact fingers, 40, to change the effective length of the coils by short circuiting their upper portions, more or less, as may be required, thus varying the resistance in circuit.

The pen arm, 3, at its upper end, has, as herein shown, a forked V-shaped clamping head, 60, in which the pen is adapted to slide horizontally, permitting its adjustment into desired relation to the rotary chart, 5, said pen being supplied with a suitable ink to trace the record on said chart.

For holding the movable solenoid rigid, when not used for recording and in carrying from one place to another, I have in the present instance (see Figs. 2, 3 and 6) provided a curved spring strip, 61, which at the rear end is secured to the frame, 7. At its front end said strip is shaped to the convex edge of the solenoid and normally acts to elevate it, raising the spindle from its supports or knife edges to engage V-shaped notchs, 62 (Figs. 2 and 3) in the outer ends of a pair of vertical arms or brackets, 63, secured to said frame, 7, on the outer side of the coils, thus to clamp it in an inoperative position. When desired, this strip may be held depressed by a spring latch, 64, permitting said spindle, 18, to rest on its knife edge supports in operative position. As an auxiliary means for preventing the coils from movement when not in use, a spring clip, 71, is provided, which is adapted to embrace said coils, and clamp them together in place, as shown in Figs. 2 and 6.

As a passage of current through the coils results in heating them according to the amperage of the current and the resistance of the coils, the spindle normally elongates, causing a separation of the V-shaped notches in its outer ends and a consequent additional deflection of said pen arm, 3. To overcome this defect, I have, as herein shown (Figs. 4 and 6), interposed a heat compensator rod, 65, between the arms of the yoke and adjustably secured thereto by the screws, 66. This rod extends through the opposite retaining plates, 14, of the stationary solenoid, 1, and adjacent the movable solenoid, 2, so that it will be heated simultaneously with the spindle, 18. This rod is of such a length and is secured to the yoke arms in such position that the consequent elongation of this rod separates the ends of the yoke proportionately to the increase of the temperature and the elongation of said spindle so that its knife supporting edges or bearings and the spindle notches continue to hold them in the same relative position one with another. By this arrangement there will be no material deflection of the pointer due to variation in temperature, thus increasing the efficiency and reliability of the instrument. It will be noted that these coils have no iron cores, thereby avoiding the lag produced by hysteresis and preferably the other metallic parts of the instrument, with the possible exception of plates, 14 and 20, are made of non-magnetic material for the same reason and to avoid effects of magnetic induction.

The portable case A stands upon leveling screws, 67, has a handle, 68, to facilitate carrying, and a hinged door, 69, upon the back of which is a recess and a spring clip, 70, adapted to hold a number of charts.

The chart, 5, is provided or marked with radial arcs and concentric circles respectively corresponding to hours of the day and the number of electrical units and is rotated once in any desired interval of time, as twenty-four hours, so that when the instrument is set for operation a daily record may be kept.

In operation the current entering by one of the binding posts flows through the solenoids and out through the other post, as has been described. As the solenoids are oppositely wound their opposed faces will be of the same polarity causing each to repel the other, and resulting in their separation, which is permitted by the movable support of the solenoid, 2. As this solenoid, 2, moves to the right (Fig. 6), its spindle, 18, moves with it, the spring support, 26, yielding to permit this movement, rocking the knife plate, 31, in its stationary supporting V-shaped notches and thus causing a deflection of the arm, 3, over the graduated chart, 2. This deflection, obviously, is proportional to the separation of the coils, their magnetization, and the electromotive force of the current. Upon a cessation of current, said spring supporting arm, 26, retracts or moves said movable coil, 2, into juxtaposition with the stationary coil, 1, where it normally remains and until repelled by current action. As the current fluctuates by variations in the voltage, the resulting mutual repulsion between said coils or solenoids and elasticity of said spring arm, 26, reciprocates the movable solenoid to position of equilibrium, the pen simultaneously producing the desired record.

By varying the resistance of the rheostat by adjustment of the slide the amount of current flowing through the instrument may be adapted to circuit conditions.

While the foregoing description relates to embodiments of my invention adapted for use as voltmeters, obviously said invention is not limited thereto and can be applied in connection with instruments for measuring other electrical units. For example, in the construction represented in the embodiment of my invention illustrated by Fig. 9 the instrument may be adapted for use as a watt meter on a three phased unbalanced circuit where the total power is the sum of the readings of two single watt meters.

Figure 9:
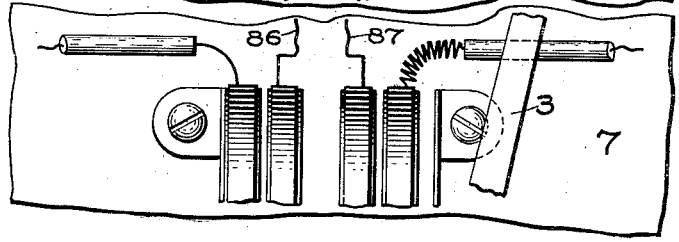

In the foregoing description involving parts of my invention a voltmeter has been shown employing but two solenoids, one fixed, the other movable. In many instances, however, it is desirable to employ a series of solenoids, grouped in pairs, one of each pair being stationary, the other movable and acting together to render the movable parts astatic relative to the external magnetic field. Furthermore, I have preferably used the term solenoid in describing the operating parts of the voltmeter, though it is evident that electric coils having suitable cores may be employed with almost as efficient results. I desire it to be understood, however, that I use the term coils generically to include any form of magnetic windings either with or without cores or armatures. In the embodiments of my invention illustrated by Figs. 8 and 9, I have shown constructions of this type of voltmeter in which a plurality of stationary coils, $1^a$, $1^b$, are provided and coöperating therewith the spindle, 18, has a plurality of movable coils, $2^a$ and $2^b$, each of which is similarly arranged and wound with reference to its adjacent stationary coil, with which it is paired or grouped, as in the construction illustrated by Figs. 1 to 4 and 6. The stationary coils, $1^a$ and $1^b$, however, are each here shown as electrically and serially connected to their adjacent movable coils, $2^a$ and $2^b$, by flexible coils, 85, and in the modification illustrated by Fig. 9 the movable coils have similar connection with their stationary coils, but the groups are not electrically connected. In Fig. 9 the two sets of coils are arranged to be connected with independent circuits acting as a differential recording instrument or one in which the sum of the quantities measured may be recorded as may be desired. In this construction the movable coil, $2^a$, is provided with a terminal, 86, and the stationary coil, $1^b$, with a terminal, 87, for that purpose, the outer opposite ends of the coils, $1^a$ and $2^b$, connecting with the binding post, 50, as in the other forms, and the terminals, 86 and 87, connecting with additional binding posts, 88, (Fig. 1), or, if desired, in circuit with the rheostat R. In either of these forms the moving part of the instrument is astatic as regards external fields and is unaffected by them so long as the moving coils are equal and opposite, as in the present construction and the distance between the groups is sufficient to prevent one from having an appreciable effect upon the other.

My invention is not limited to the particular embodiment herein selected for purposes of illustration only, nor to the specific details of construction and arrangement, as the same may be modified within wide limits without departing from the spirit and scope thereof.

Claims.

1. In an electrical measuring instrument, the combination of a pair of relatively movable coils provided with equal and opposite windings; and supporting means therefor normally maintaining their opposed faces in contact while permitting separation thereof when energized by an electrical current, said equal and opposite windings, and said supporting means coöperating to prevent cumulative inductional effects, and to compensate the effects of self-induction by mutual inductive effects.

2. An electrical measuring instrument comprising a stationary and a movable coil having a spindle provided respectively with a yielding support for one end of said spindle, and a rocking knife edge support for the other, an arm carried by said knife edge support, and deflected thereby, said coils being equally wound in opposite directions to produce a replusion therebetween, when energized by an electrical current and producing a deflection of said arm.

3. In an electrical measuring instrument, the combination of a pair of relatively movable coils having mutual repulsion when energized, the windings of the respective coils being equal and in opposite directions, to prevent cumulative inductional effects between the two.

4. An electrical measuring instrument comprising a pair of axially arranged coils, equally and oppositely wound, one of said coils having a longitudinal aperture and a fixed support, the other a longitudinally extending spindle slidable in said aperture, and yielding supporting means for its opposite ends for normally holding said coil in juxtaposition to the stationary coil and permitting separation therefrom by the passage of an electrical current therethrough.

5. In an electrical measuring instrument an electrical coil, provided with a supporting spindle, supports for said spindle, and a temperature compensator interposed between and connecting said supports for maintaining their position relative to said spindle.

6. In an electrical measuring instrument, the combination of a pair of relatively movable armatureless coils; a spindle for one of said coils; movable supporting means for said spindle arranged to hold the coils normally in contact; said coils being equally and oppositely wound in series to prevent cumulative inductional effects between the two and to compensate self-inductional effects by mutual inductional effects.

7. In an electrical measuring instrument, the combination of a plurality of pairs of relatively movable coils connected in opposition, each pair comprising coils of opposite and equal windings to prevent cumulative inductional effects between the coils of a pair and render said coils coöperatively astatic relative to external fields.

8. In an electrical measuring instrument, the combination of a fixed coil; and a movable coil mounted to move away from the former when energized, the windings of the respective coils being equal and opposite in direction to prevent cumulative inductional effects between the two and to compensate self-inductional effects by mutual inductional effects.

9. The combination of a stationary and movable coils, equally and oppositely wound and arranged for separation one from another, a knife edge plate having inclined or tapered ends, knife edge supports for said ends each provided with a bearing wall against which said ends abut to permit rocking of said plate in said bearing with a minimum amount of friction and connections between said movable coil and knife edge plate to rock said plate by a movement of said coil.

10. The combination of a stationary and movable coils, equally and oppositely wound and arranged for separation one from another, said movable coils having a supporting spindle provided with a bearing wall, a knife edge plate having inclined or tapered ends, and knife edge supports for said ends each provided with a bearing wall against which said ends abut to permit rocking of said plate in said bearing with a minimum amount of friction, said plate having a horse-shoe shaped recess to engage the bearing wall of said spindle to be rocked thereby.

11. An electrical instrument comprising a plurality of movable and stationary coils wound to cause the movable part to be astatic relative to external fields, a knife edge plate having inclined or tapered ends, knife edge supports for said ends each provided with a bearing wall against which said ends abut to permit rocking said plate in said bearing with a minimum amount of friction, and a movable spindle constituting the support for said movable coil and having a knife edge bearing and a bearing wall to engage said knife edge plate to rock it, said plate having a horse-shoe shaped recess to engage the bearing wall of said spindle to be rocked.

12. In an electrical measuring instrument, the combination of a pair of relatively movable coils equally and oppositely wound; yielding supporting means for one of said coils including a movable member having an arm oscillable by movement of said coil and constituting a multiple device therefor, said equal and opposite windings and said yielding supporting means coöperating to compensate self-inductional effects by mutual inductional effects.

13. In an electrical measuring instrument the combination of a movable coil; oscillable supporting means therefor permitting substantially axial movement of the coil; and temperature compensating means to maintain constant relation between the supporting portions of said oscillable means, and the centers of oscillation.

14. In an electrical measuring instrument, the combination of a movable coil having an attached spindle; oscillable supporting means for said spindle; and a temperature compensator to cause separation of the centers of oscillation in consonance with expansion of said spindle.

15. In an electrical measuring instrument, the combination of a movable coil having a supporting member; a pair of movable supporting arms therefor; and a temperature compensator acting upon said arms, causing the latter to separate in consonance with expansion of the coil supporting member.

16. In an electrical measuring instrument, the combination of a movable coil having a supporting member; a pair of yielding supporting arms therefor; and a temperature compensator acting upon said arms and causing the same to separate bodily without yielding in consonance with expansion of the coil supporting member.

17. In an electrical measuring instrument; a fixed coil; a member movable in the field of said coil; a shaft or spindle supporting said member; knife edge bearings at each end of said shaft; a blade spring fitting one of said knife edge bearings; a blade having an upper and a lower knife edge, the upper edge of which is adapted to receive the knife edge bearing at the other end of said shaft, said blade having a notch in its upper portion, and a plate carried by said latter knife edge bearing fitting said notch; two knife edge bearings supporting the lower edge of said blade, and provided with end plates to prevent lateral movement of said blade; and an indicating or recording arm attached to said blade.

18. In an electrical measuring instrument, the combination of a stationary coil and a movable member magnetically oscillated thereby, said movable member having a supporting shaft or spindle provided with a bearing wall, a knife edge plate having inclined or tapered ends, and knife edge supports for said ends each provided with a bearing wall against which said ends abut, said plate having a horse shoe shaped recess to engage the bearing wall of said spindle.

19. In an electrical measuring instrument, the combination of mutually-repulsive oppositely wound coils having equal ampere turns and equal self-inductive capacities, whereby mutual inductive effects compensate self-inductive effects and an indicating device operable by mutual repulsion of said coils.

20. In an electrical measuring instrument, the combination of mutually-repulsive oppositely wound coils of equal self-inductive capacity whereby mutual inductive effects compensate self-inductive effects and an indicating device operable by mutual repulsion of said coils.

In testimony whereof, I have signed my name to this specification, in the presence of two subscribing witnesses.

WATSON E. GOODYEAR.

Witnesses:
 SIDNEY F. SMITH,
 ROBERT H. KAMMLER.